(12) United States Patent
Swanson

(10) Patent No.: US 12,141,913 B2
(45) Date of Patent: *Nov. 12, 2024

(54) SELECTING A POINT TO NAVIGATE VIDEO AVATARS IN A THREE-DIMENSIONAL ENVIRONMENT

(71) Applicant: Katmai Tech Inc., New York, NY (US)

(72) Inventor: Kristofor Bernard Swanson, Anchorage, AK (US)

(73) Assignee: Katmai Tech Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/221,062

(22) Filed: Jul. 12, 2023

(65) Prior Publication Data

US 2024/0087213 A1 Mar. 14, 2024

Related U.S. Application Data

(63) Continuation of application No. 17/931,791, filed on Sep. 13, 2022, now Pat. No. 11,748,939.

(51) Int. Cl.
*G06T 15/20* (2011.01)
*G06F 3/04815* (2022.01)
(Continued)

(52) U.S. Cl.
CPC .......... *G06T 15/20* (2013.01); *G06F 3/04815* (2013.01); *G06F 3/04842* (2013.01);
(Continued)

(58) Field of Classification Search
None
See application file for complete search history.

(56) References Cited

U.S. PATENT DOCUMENTS 6,215,498 B1 4/2001 Filo et al.
6,559,863 B1 5/2003 Megiddo
(Continued)

FOREIGN PATENT DOCUMENTS

CN 103580881 A 2/2014
CN 105487657 A 4/2016
(Continued)

OTHER PUBLICATIONS

Dipaola, S. and Collins, D., "A 3D Virtual Environment for Social Telepresence", Mar. 2002; 6 pages.
(Continued)

*Primary Examiner* — Nurun Flora
(74) *Attorney, Agent, or Firm* — Sterne, Kessler, Goldstein and Fox P.L.L.C.

(57) ABSTRACT

In an aspect, a computer-implemented method allows for navigation in a three-dimensional (3D) virtual environment. In the method, data specifying a three-dimensional virtual space is received. A position and direction in the three-dimensional virtual space is received. The position and direction input by a first user and representing a first virtual camera used to render the three-dimensional virtual space to the first user. A video stream captured from a camera positioned to capture the first user is received. A second virtual camera is navigated according to an input of a second user.

20 Claims, 13 Drawing Sheets

(51) Int. Cl.
  *G06F 3/04842* (2022.01)
  *G06T 13/40* (2011.01)
  *G06T 15/04* (2011.01)

(52) U.S. Cl.
  CPC .............. *G06T 13/40* (2013.01); *G06T 15/04* (2013.01); *G06T 2200/24* (2013.01); *G06T 2210/21* (2013.01)

(56) References Cited

U.S. PATENT DOCUMENTS

| | | |
|---|---|---|
| 6,583,808 B2 | 6/2003 | Boulanger et al. |
| 6,853,398 B2 | 2/2005 | Malzbender et al. |
| 7,197,126 B2 | 3/2007 | Kanada |
| 7,346,654 B1 | 3/2008 | Weiss |
| 7,634,073 B2 | 12/2009 | Kanada |
| 7,840,668 B1 | 11/2010 | Sylvain et al. |
| 8,072,479 B2 | 12/2011 | Valliath et al. |
| 8,279,254 B2 | 10/2012 | Goose et al. |
| 8,403,751 B2 | 3/2013 | Boustead et al. |
| 8,520,872 B2 | 8/2013 | Jang et al. |
| 8,620,009 B2 | 12/2013 | Zhang et al. |
| 9,041,764 B2 | 5/2015 | Wang et al. |
| 9,218,685 B2 | 12/2015 | Piemonte et al. |
| 9,305,319 B2 | 4/2016 | Maor et al. |
| 9,384,594 B2 | 7/2016 | Maciocci et al. |
| 9,420,229 B2 | 8/2016 | Pourashraf et al. |
| 9,565,316 B2 | 2/2017 | Gleim |
| 9,607,428 B2 | 3/2017 | Li |
| 9,656,168 B1 | 5/2017 | Bear et al. |
| 9,661,274 B2 | 5/2017 | Kubota et al. |
| 9,743,044 B2 | 8/2017 | Safaei et al. |
| 9,910,509 B2 | 3/2018 | Markovic et al. |
| 10,013,805 B2 | 7/2018 | Barzuza et al. |
| 10,155,164 B2 | 12/2018 | Boustead et al. |
| 10,304,238 B2 | 5/2019 | Cooper et al. |
| 10,304,239 B2 | 5/2019 | Gorur Sheshagiri et al. |
| 10,334,384 B2 | 6/2019 | Sun et al. |
| 10,356,216 B2 | 7/2019 | Khalid et al. |
| 10,573,071 B2 | 2/2020 | Sun et al. |
| 10,609,334 B2 | 3/2020 | Li |
| 10,679,411 B2 | 6/2020 | Ziman |
| 10,979,672 B1 | 4/2021 | Krol et al. |
| 11,057,351 B1 | 7/2021 | Simanel et al. |
| 11,748,939 B1* | 9/2023 | Swanson .................. G06F 3/011 345/427 |
| 2002/0158873 A1 | 10/2002 | Williamson |
| 2004/0104935 A1* | 6/2004 | Williamson ............ G06V 10/10 715/757 |
| 2007/0274528 A1 | 11/2007 | Nakamoto et al. |
| 2009/0113314 A1 | 4/2009 | Dawson et al. |
| 2009/0256840 A1* | 10/2009 | Varadhan ................. G06T 15/20 345/419 |
| 2011/0072367 A1 | 3/2011 | Bauer |
| 2013/0321564 A1 | 12/2013 | Smith et al. |
| 2014/0058807 A1* | 2/2014 | Altberg .................... H04L 12/66 348/14.08 |
| 2014/0118495 A1 | 5/2014 | Coombe |
| 2014/0354631 A1* | 12/2014 | Yamaoka ................ G06T 19/20 345/419 |
| 2015/0302661 A1 | 10/2015 | Miller |
| 2015/0371447 A1 | 12/2015 | Yasutake |
| 2016/0284136 A1 | 9/2016 | Johnston et al. |
| 2017/0351476 A1 | 12/2017 | Yoakum |
| 2019/0199993 A1 | 6/2019 | Babu J D et al. |
| 2019/0310761 A1 | 10/2019 | Agarawala et al. |
| 2019/0320144 A1 | 10/2019 | Tong et al. |
| 2019/0354170 A1 | 11/2019 | Rosedale |
| 2019/0371060 A1 | 12/2019 | Energin et al. |
| 2020/0008003 A1 | 1/2020 | Thompson et al. |
| 2020/0037091 A1 | 1/2020 | Jeon et al. |
| 2020/0098191 A1 | 3/2020 | McCall |
| 2020/0221247 A1 | 7/2020 | Latypov et al. |
| 2020/0236346 A1 | 7/2020 | Kato |

FOREIGN PATENT DOCUMENTS

| | | |
|---|---|---|
| CN | 103888714 B | 4/2017 |
| CN | 106648528 A | 5/2017 |
| CN | 108319439 A | 7/2018 |
| CN | 106528038 B | 9/2019 |
| CN | 112156467 A | 1/2021 |
| EP | 3282669 B1 | 1/2020 |
| EP | 3627860 A1 | 3/2020 |
| EP | 3684083 A1 | 7/2020 |
| GB | 2351216 B | 12/2002 |
| JP | H07288791 A | 10/1995 |
| JP | 2003006132 A | 1/2003 |
| JP | 4426484 B2 | 3/2010 |
| KR | 20200028871 A | 3/2020 |
| WO | WO 2008125593 A2 | 10/2008 |
| WO | WO 2008141596 A1 | 11/2008 |
| WO | WO 2010083119 A2 | 7/2010 |
| WO | WO 2010143359 A1 | 12/2010 |
| WO | WO 2018005235 A1 | 1/2018 |
| WO | WO 2019008320 A1 | 1/2019 |
| WO | WO 2019046597 A1 | 3/2019 |
| WO | WO 2020041652 A1 | 2/2020 |

OTHER PUBLICATIONS

EngageVR, "Next Generation Education, Training, Meetings & Events," accessed at https://engagevr.io/, accessed on Oct. 28, 2020; 6 pages.
Event Farm, "Bring Your Events Into the Virtual World," accessed at https://eventfarm.com/the-echo, accessed on Oct. 28, 2020; 6 pages.
Hongtongsak, K., "Accurately Pinpointing 3D Sound in Virtual Environments," Jun. 2016, 31 pages.
Johansson, N., "The 10 Best VR Meeting Apps—Productive Remote Collaboration," accessed at https://immersive.ly/best-vr-apps-productive-remote-meetings/, accessed on Oct. 28, 2020; 10 pages.
Leung, W. and Chen, T., "Networked Collaborative Environment With Animated 3D Avatars, Dept. of Electrical and Computer Engineering Carnegie Mellon University," Aug. 6, 2002; 3 pages.
Leung, W. et al.., "Networked Intelligent Collaborative Environment (NetICE), Multimedia and Expo 2000," Aug. 6, 2002; 4 pages.
Leung, W. and Chen, T., "A Multi-User 3-D Virtual Environment With Interactive Collaboration and Shared Whiteboard Technologies, Kluwer Academic Publishers," Jul. 23, 2003, 17 pages.
Lin, J. et al., "A Virtual Reality Platform for Dynamic Human-Scene Interaction," Dec. 2016; 4 pages.
Nishihara, R. and Okubo, M., "A Study on Personal Space in Virtual Space Based on Personality," 2015; 8 pages.
Sandre, A., "Is Virtual Reality the Future of Video Conferencing?" May 15, 2020; 7 pages.
De Sousa, A., "Remote Proxemics for Collaborative Virtual Environments," Nov. 2014; 10 pages.
Takahashi, D., "MeetinVR launches online VR meetings with 'superpowers'," venturebeat.com, accessed at https://venturebeat.com/2020/05/27/meetinvr-launches-online-vr-meetings-with-superpowers, published May 27, 2020; 7 pages.
Teooh, "Virtual Spaces for Real Communities," accessed at https://teooh.com/, accessed on Oct. 28, 2020; 3 pages.
VirBELA Media, "Team Suites," accessed at https://www.virbela.com/teamsuites, accessed on Oct. 1, 2020; 26 pages.
Virtway Events, "Your 3D Space for Events," accessed at https://www.virtwayevents.com/, accessed on Oct. 28, 2020; 5 pages.
SaganWorks product website, "A personal metaverse of knowledge: Create stunning spaces to organize and store your information," available at https://saganworks.com, accessed Aug. 4, 2022; 4 pages.
Spatial, "Frequently Asked Questions," product website available at https://support.spatial.io/hc/en-us, accessed Aug. 4, 2022; 3 pages.
VSpatial product website, Virtual Reality Offices, "The workspace of the Future is Here." available at https://vspatial.com, accessed Aug. 4, 2022; 5 pages.

(56) References Cited

OTHER PUBLICATIONS

LearnOpenGL—CSM Online Resource, "Cascaded Shadow Mapping," available at https://learnopengl.com/Guest-Articles/2021/CSM, accessed Aug. 2, 2022; 10 pages.

Wikipedia, online resource, "Shadow mapping," available at https://en.wikipedia.org/wiki/Shadow_mapping, accessed Aug. 2, 2022; 6 pages.

Wikipedia, online resource, "Volumetric lighting," available at https://en.wikipedia.org/wiki/Volumetric_lighting, accessed Aug. 2, 2022; 2 pages.

* cited by examiner

SELECTING A POINT TO NAVIGATE VIDEO AVATARS IN A THREE-DIMENSIONAL ENVIRONMENT

CROSS REFERENCE TO RELATED APPLICATION

This application is a continuation of U.S. application Ser. No. 17/931,791, filed Sep. 13, 2022 (now pending), which is incorporated herein by reference in its entirety.

BACKGROUND

Technical Field

Aspects of the present disclosure relate to components, systems, and methods for navigating in a virtual environment.

Related Art

Video conferencing involves the reception and transmission of audio-video signals by users at different locations for communication between people in real time. Videoconferencing is widely available on many computing devices from a variety of different services, including the ZOOM service available from Zoom Communications Inc. of San Jose, CA. Some videoconferencing software, such as the FaceTime application available from Apple Inc. of Cupertino, CA, comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other user devices.

Many of these videoconferencing applications have a screen share functionality. When a user decides to share their screen (or a portion of their screen), a stream is transmitted to the other users' devices with the contents of their screen. In some cases, other users can even control what is on the user's screen. In this way, users can collaborate on a project or make a presentation to the other meeting participants.

Recently, videoconferencing technology has gained importance. Especially since the COVID-19 pandemic, many workplaces, trade shows, meetings, conferences, schools, and places of worship are now taking place at least partially online. Virtual conferences using videoconferencing technology are increasingly replacing physical conferences. In addition, this technology provides advantages over physically meeting to avoid travel and commuting.

However, often, use of this videoconferencing technology causes loss of a sense of place. There is an experiential aspect to meeting in person physically, being in the same place, that is lost when conferences are conducted virtually. There is a social aspect to being able to posture yourself and look at your peers. This feeling of experience is important in creating relationships and social connections. Yet, this feeling is lacking when it comes to conventional videoconferences.

Moreover, when the conference starts to get several participants, additional problems occur with these videoconferencing technologies. Where with physical meeting conferences people are able to gather in an area or a conference room to effectively interact with one another, virtual conferences often limit the ability to see or hear all participants. Even when all participants can be seen or heard in the virtual world, there may be a problem finding natural spacing or ordering amongst the participants.

Further in physical meeting conferences, people can have side interactions. You can project your voice so that only people close to you can hear what you're saying. In some cases, you can even have private conversations in the context of a larger meeting. However, with virtual conferences, when multiple people are speaking at the same time, the software mixes the two audio streams substantially equally, causing the participants to speak over one another. Thus, when multiple people are involved in a virtual conference, private conversations are impossible, and the dialogue tends to be more in the form of speeches from one to many. Here, too, virtual conferences lose an opportunity for participants to create social connections and to communicate and network more effectively.

Massively multiplayer online games (MMOG or MMO) generally can handle quite a few more than 25 participants. These games often have hundreds or thousands of players on a single server. MMOs often allow players to navigate avatars around a virtual world. Sometimes these MMOs allow users to speak with one another or send messages to one another. Examples include the ROBLOX game available from Roblox Corporation of San Mateo, CA, and the MINECRAFT game available from Mojang Studios of Stockholm, Sweden.

Having bare avatars interact with one another also has limitations in terms of social interaction. These avatars usually cannot communicate facial expressions, which people often make inadvertently. These facial expressions are observable in videoconferences. Some publications may describe having video placed on an avatar in a virtual world. However, these systems typically require specialized software and have other limitations that limit their usefulness.

To navigate in a virtual environment, some gaming systems use keyboard interactions such as the WASD keys to navigate in different directions. This can be limiting situations where a keyboard is unavailable. Also, continually pressing one or keys to navigate can be distracting will to a the user.

Improved methods are needed for videoconferencing.

SUMMARY

In an aspect, a computer-implemented method allows for navigation in a three-dimensional (3D) virtual environment. In the method, data specifying a three-dimensional virtual space is received. A position and direction input by a first user in the three-dimensional virtual space A video stream captured from a camera on a device of the first user is received. The camera is positioned to capture photographic images of the first user. The video stream is mapped onto a model of an avatar. From a perspective of a virtual camera of a second user, an image of the three-dimensional virtual space including the model of the avatar located at the position and oriented at the direction is rendered for display to the second user. A selection of a position on the image is received. The selection is made by the second user. A ray is from a position of the virtual camera such that the ray is extended toward the selection. An intersection of the ray with an object in the three-dimensional (3D) virtual environment is determined. And, finally, the virtual camera is moved to a new position at the intersection.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Video Conference with Avatars in a Virtual Environment

Figure 1:
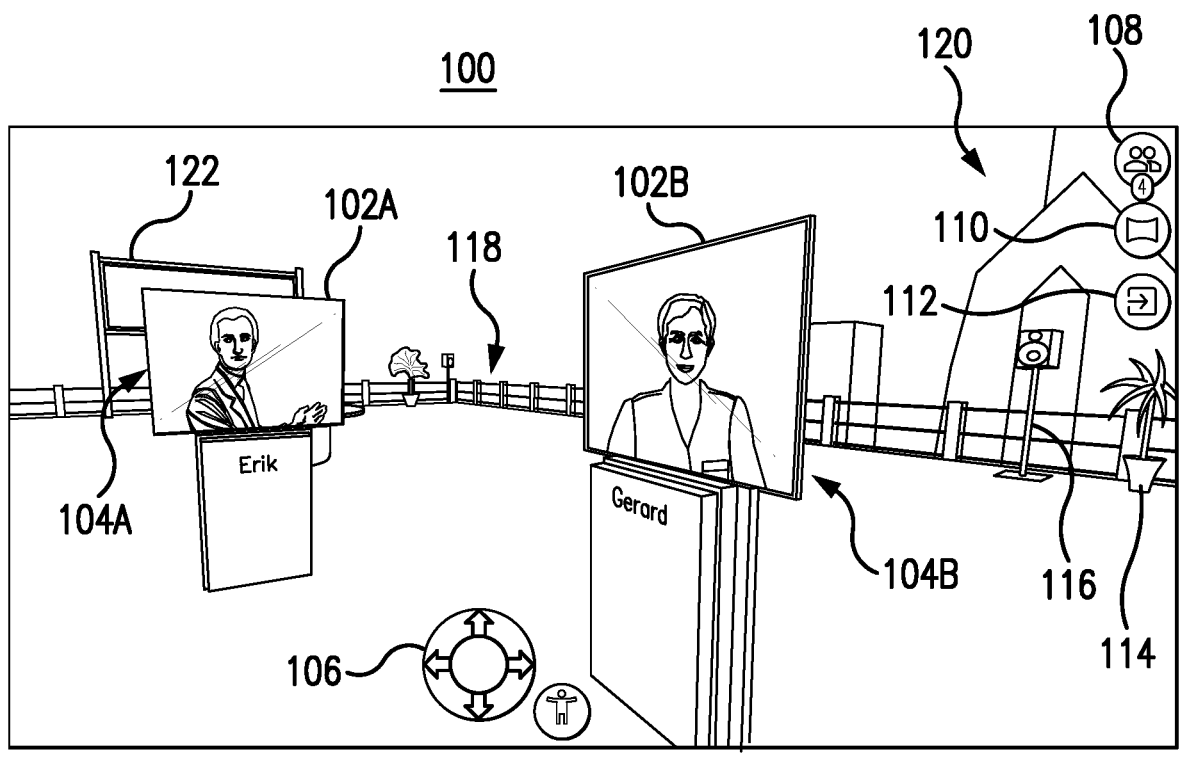
FIG. 1 is a diagram illustrating an example interface that provides videoconferencing in a virtual environment with video streams being mapped onto avatars.

FIG. 1 is a diagram illustrating an example of an interface 100 that provides videoconferences in a virtual environment with video streams being mapped onto avatars.

Interface 100 may be displayed to a participant to a videoconference. For example, interface 100 may be rendered for display to the participant and may be constantly updated as the videoconference progresses. A user may control the orientation of their virtual camera using, for example, keyboard inputs. In this way, the user can navigate around a virtual environment. In an aspect, different inputs may change the virtual camera's X and Y position and pan and tilt angles in the virtual environment. In further aspects, a user may use inputs to alter height (the Z coordinate) or yaw of the virtual camera. In still further aspects, a user may enter inputs to cause the virtual camera to "hop" up while returning to its original position, simulating gravity. The inputs available to navigate the virtual camera may include, for example, keyboard and mouse inputs, such as WASD keyboard keys to move the virtual camera forward, backward, left, or right on an X-Y plane, a space bar key to "hop" the virtual camera, and mouse movements specifying changes in pan and tilt angles.

Interface 100 includes avatars 102A and B, which each represent different participants to the videoconference. Avatars 102A and B, respectively, have texture mapped video streams 104A and B from devices of the first and second participant. A texture map is an image applied (mapped) to the surface of a shape or polygon. Here, the images are respective frames of the video. The camera devices capturing video streams 104A and B are positioned to capture faces of the respective participants. In this way, the avatars have texture mapped thereon, moving images of faces as participants in the meeting talk and listen.

Similar to how the virtual camera is controlled by the user viewing interface 100, the location and direction of avatars 102A and B are controlled by the respective participants that they represent. Avatars 102A and B are three-dimensional models represented by a mesh. Each avatar 102A and B may have the participant's name underneath the avatar.

The respective avatars 102A and B are controlled by the various users. They each may be positioned at a point corresponding to where their own virtual cameras are located within the virtual environment. Just as the user viewing interface 100 can move around the virtual camera, the various users can move around their respective avatars 102A and B.

The virtual environment rendered in interface 100 includes background image 120 and a three-dimensional model 118 of an arena. The arena may be a venue or building in which the videoconference should take place. The arena may include a floor area bounded by walls. Three-dimensional model 118 can include a mesh and texture. Other ways to mathematically represent the surface of three-dimensional model 118 may be possible as well. For example, polygon modeling, curve modeling, and digital sculpting may be possible. For example, three-dimensional model 118 may be represented by voxels, splines, geometric primitives, polygons, or any other possible representation in three-dimensional space. Three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other three-dimensional models that illustrate different components of the environment. For example, the three-dimensional environment can include a decorative model 114, a speaker model 116, and a presentation screen model 122. Just as with model 118, these models can be represented using any mathematical way to represent a geometric surface in three-dimensional space. These models may be separate from model 118 or combined into a single representation of the virtual environment.

Decorative models, such as model 114, serve to enhance the realism and increase the aesthetic appeal of the arena. Speaker model 116 may virtually emit sound, such as presentation and background music. Presentation screen model 122 can serve to provide an outlet to present a presentation. Video of the presenter or a presentation screen share may be texture mapped onto presentation screen model 122.

Button 108 may provide the user with a list of participants. In one example, after a user selects button 108, the user can chat with other participants by sending text messages, individually or as a group.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110°, which is commensurate with a wide-angle lens and human vision. However, selecting button 110 may cause the virtual camera to increase the field of view to exceed 170°, commensurate with a fisheye lens. This may enable a user to have broader peripheral awareness of their surroundings in the virtual environment.

Finally, button 112 causes the user to exit the virtual environment. Selecting button 112 may cause a notification to be sent to devices belonging to the other participants signaling to their devices to stop displaying the avatar corresponding to the user previously viewing interface 100.

In this way, interface virtual 3D space is used to conduct video conferencing. Every user controls an avatar, which they can control to move around, look around, jump or do other things which change the position or orientation. A virtual camera shows the user the virtual 3D environment and the other avatars. The avatars of the other users have as an integral part a virtual display, which shows the webcam image of the user.

By giving users a sense of space and allowing users to see each other's faces, aspects provide a more social experience than conventional web conferencing or conventional MMO gaming. That more social experience has a variety of applications. For example, it can be used in online shopping. For example, interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guide, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/sword fighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective when a user wishes to experience the reactions), job interviews, game shows, interactive fiction (e.g., murder mystery), virtual fishing, virtual sailing, psychological research, behavioral analysis, virtual sports (e.g., climbing/bouldering), controlling the lights etc. in your house or other location (domotics), memory palace, archaeology, gift shop, virtual visit so customers will be more comfortable on their real visit, virtual medical procedures to explain the procedures and have people feel more comfortable, and virtual trading floor/financial marketplace/stock market (e.g., integrating real-time data and video feeds into the virtual world, real-time transactions and analytics), virtual location people have to go to as part of their work so they will actually meet each other organically (e.g., if you want to create an invoice, it is only possible from within the virtual location) and augmented reality where you project the face of the person on top of their AR headset (or helmet) so you can see their facial expressions (e.g., useful for military, law enforcement, firefighters, and special ops), and making reservations (e.g., for a certain holiday, home/car/etc.)

Figure 2:
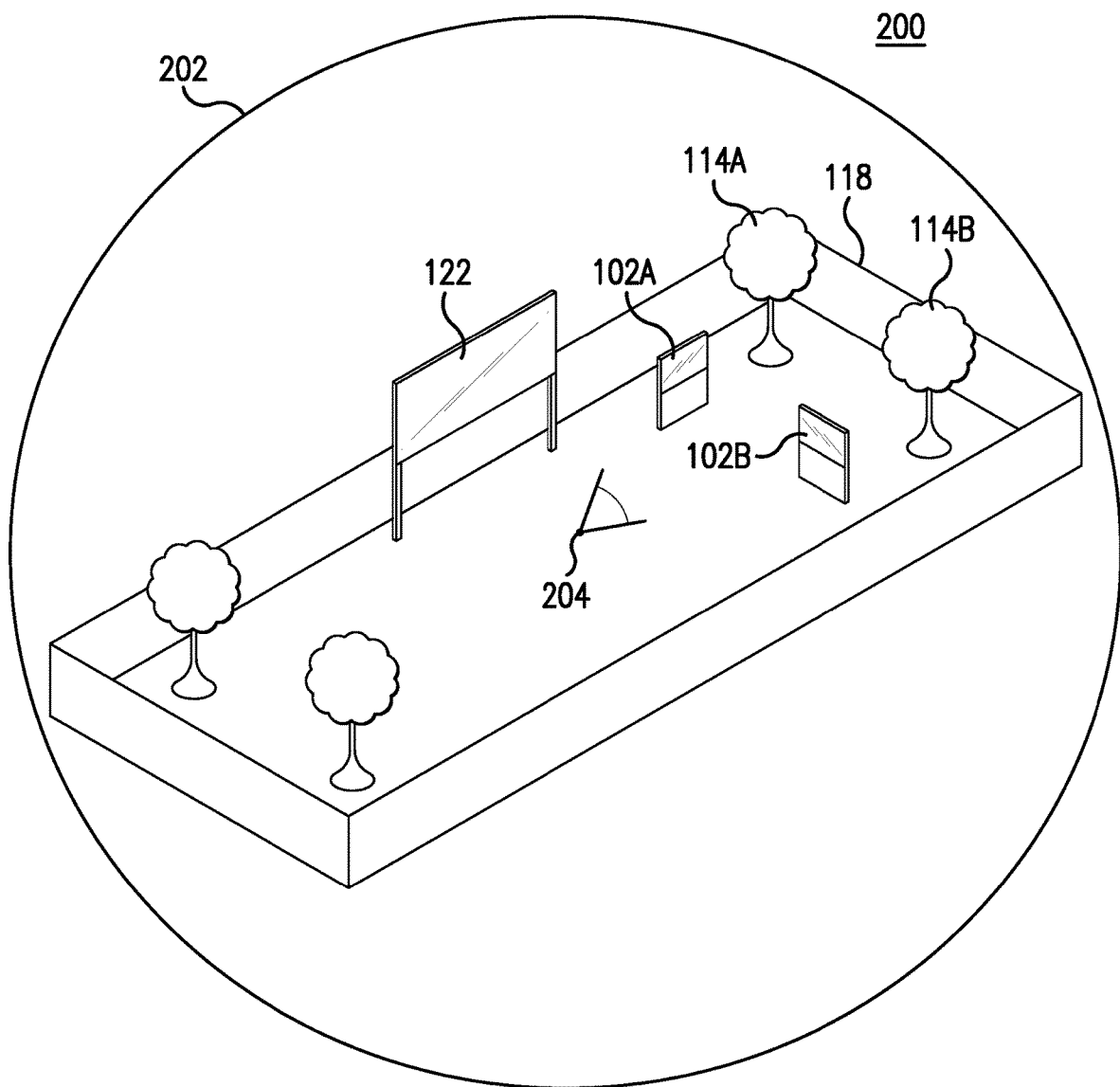
FIG. 2 is a diagram illustrating a three-dimensional model used to render a virtual environment with avatars for videoconferencing.

FIG. 2 is a diagram 200 illustrating a three-dimensional model used to render a virtual environment with avatars for videoconferencing. Just as illustrated in FIG. 1, the virtual environment here includes a three-dimensional arena 118, and various three-dimensional models, including three-dimensional models 114 and 122. Also as illustrated in FIG. 1, diagram 200 includes avatars 102A and B navigating around the virtual environment.

As described above, interface 100 in FIG. 1 is rendered from the perspective of a virtual camera. That virtual camera is illustrated in diagram 200 as virtual camera 204. As mentioned above, the user viewing interface 100 in FIG. 1 can control virtual camera 204 and navigate the virtual camera in three-dimensional space. Interface 100 is constantly being updated according to the new position of virtual camera 204 and any changes of the models within the field of view of virtual camera 204. As described above, the field of view of virtual camera 204 may be a frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other aspects, other shapes instead of sphere 202 may be used to texture map the background image. In various alternative aspects, the shape may be a cylinder, cube, rectangular prism, or any other three-dimensional geometric shape.

Figure 3:
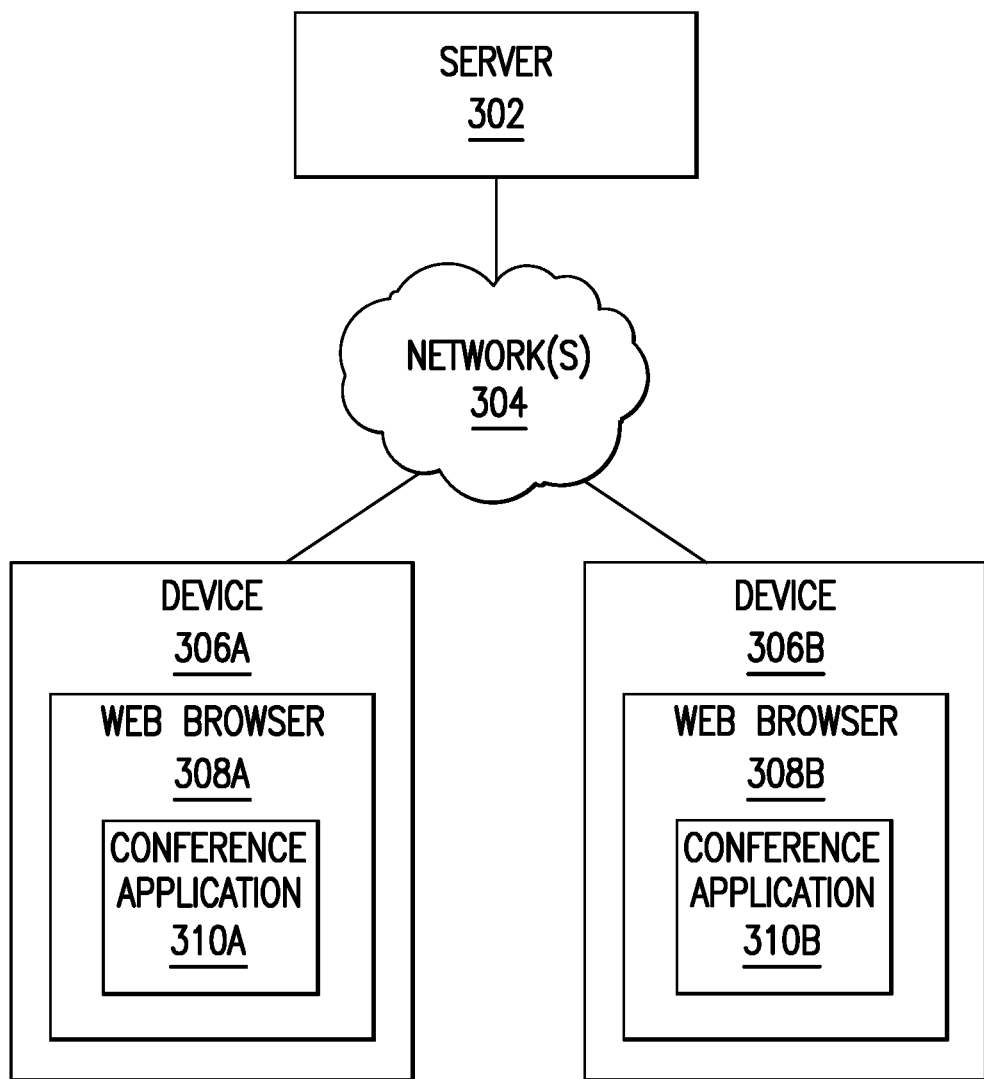
FIG. 3 is a diagram illustrating a system that provides videoconferences in a virtual environment.

FIG. 3 is a diagram illustrating a system 300 that provides videoconferences in a virtual environment. System 300 includes a server 302 coupled to devices 306A and B via one or more networks 304.

Server 302 provides the services to connect a videoconference session between devices 306A and 306B. As will be described in greater detail below, server 302 communicates notifications to devices of conference participants (e.g., devices 306A-B) when new participants join the conference and when existing participants leave the conference. Server 302 communicates messages describing a position and direction in a three-dimensional virtual space for respective participant's virtual cameras within the three-dimensional virtual space. Server 302 also communicates video and audio streams between the respective devices of the participants (e.g., devices 306A-B). Finally, server 302 stores and transmits data describing data specifying a three-dimensional virtual space to the respective devices 306A-B.

In addition to the data necessary for the virtual conference, server 302 may provide executable information that instructs the devices 306A and 306B on how to render the data to provide the interactive conference.

Server 302 responds to requests with a response. Server 302 may be a web server. A web server is software and hardware that uses HTTP (Hypertext Transfer Protocol) and other protocols to respond to client requests made over the World Wide Web. The main job of a web server is to display website content through storing, processing and delivering webpages to users.

In an alternative aspect, communication between devices 306A-B happens not through server 302 but on a peer-to-peer basis. In that aspect, one or more of the data describing the respective participants' location and direction, the notifications regarding new and existing participants, and the video and audio streams of the respective participants are communicated not through server 302 but directly between devices 306A-B.

Network 304 enables communication between the various devices 306A-B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Devices 306A-B are each devices of respective participants to the virtual conference. Devices 306A-B each receive data necessary to conduct the virtual conference and render the data necessary to provide the virtual conference. As will be described in greater detail below, devices 306A-B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A-B can be any type of computing device, including a laptop, a desktop, a smartphone, a tablet computer, or a wearable computer (such as a smartwatch or a augmented reality or virtual reality headset).

Web browser 308A-B can retrieve a network resource (such as a webpage) addressed by the link identifier (such as a uniform resource locator, or URL) and present the network resource for display. In particular, web browser 308A-B is a software application for accessing information on the World Wide Web. Usually, web browser 308A-B makes this request using the hypertext transfer protocol (HTTP or HTTPS). When a user requests a web page from a particular website, the web browser retrieves the necessary content from a web server, interprets and executes the content, and then displays the page on a display on device 306A-B shown as client/counterpart conference application 310A-B. In examples, the content may have HTML and client-side scripting, such as JavaScript. Once displayed, a user can input information and make selections on the page, which can cause web browser 308A-B to make further requests.

Conference application 310A-B may be a web application downloaded from server 302 and configured to be executed by the respective web browsers 308A-B. In an aspect, conference application 310A-B may be a JavaScript application. In one example, conference application 310A-B may be written in a higher-level language, such as a Typescript language, and translated or compiled into JavaScript. Conference application 310A-B is configured to interact with the WebGL JavaScript application programming interface. It may have control code specified in JavaScript and shader code written in OpenGL ES Shading Language (GLSL ES). Using the WebGL API, conference application 310A-B may be able to utilize a graphics processing unit (not shown) of device 306A-B. Moreover, OpenGL rendering of interactive two-dimensional and three-dimensional graphics without the use of plug-ins is also possible.

Conference application 310A-B receives the data from server 302 describing position and direction of other avatars and three-dimensional modeling information describing the virtual environment. In addition, conference application 310A-B receives video and audio streams of other conference participants from server 302.

Conference application 310A-B renders three three-dimensional modeling data, including data describing the three-dimensional environment and data representing the respective participant avatars. This rendering may involve rasterization, texture mapping, ray tracing, shading, or other rendering techniques. In an aspect, the rendering may involve ray tracing based on the characteristics of the virtual camera. Ray tracing involves generating an image by tracing a path of light as pixels in an image plane and simulating the effects of encounters with virtual objects. In some aspects, to enhance realism, the ray tracing may simulate optical effects such as reflection, refraction, scattering, and dispersion.

In this way, the user uses web browser 308A-B to enter a virtual space. The scene is displayed on the screen of the user. The webcam video stream and microphone audio stream of the user are sent to server 302. When other users enter the virtual space an avatar model is created for them. The position of this avatar is sent to the server and received by the other users. Other users also get a notification from server 302 that an audio/video stream is available. The video stream of a user is placed on the avatar that was created for that user. The audio stream is played back as coming from the position of the avatar.

Figure 4A:
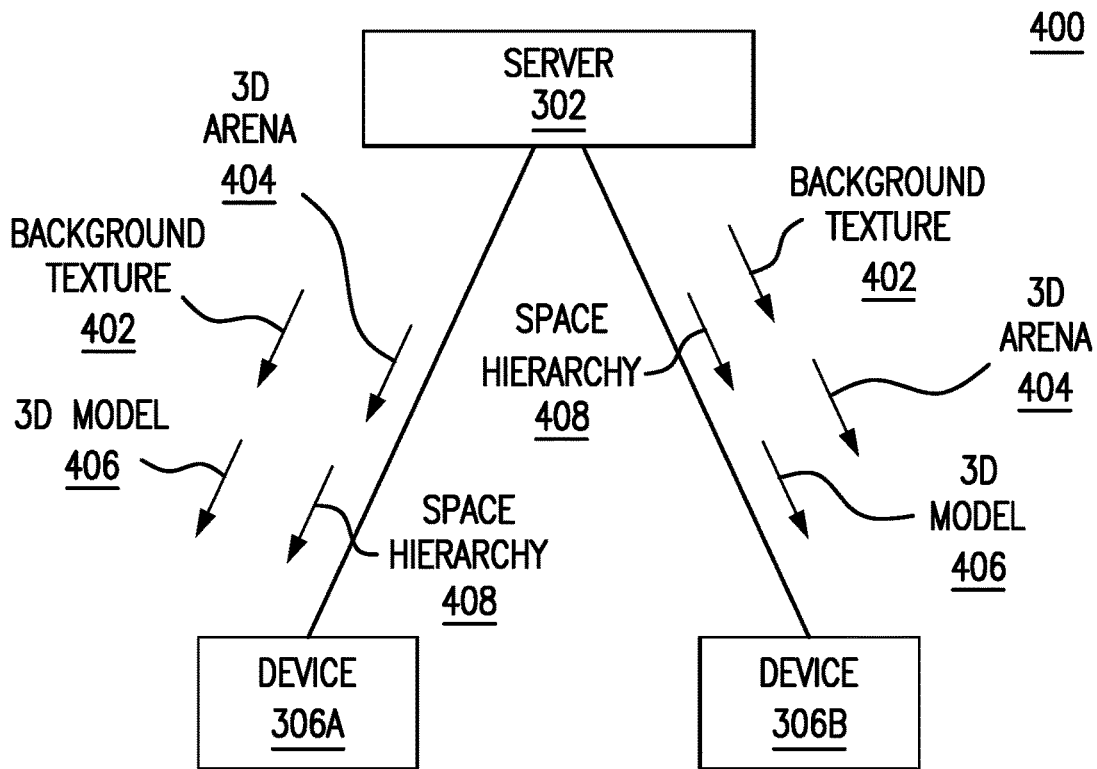
FIGS. 4A-4C illustrate how data is transferred between various components of the system in FIG. 3 to provide videoconferencing.
Figure 4B:
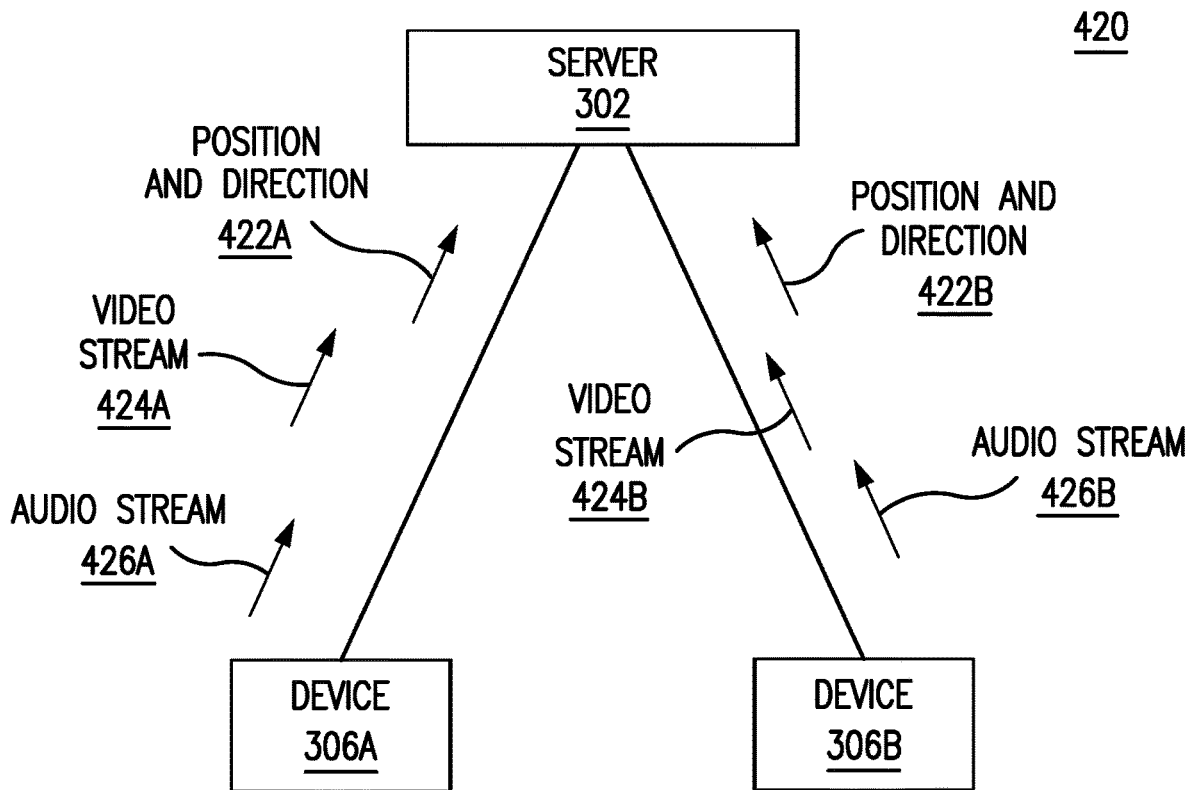
Figure 4C:
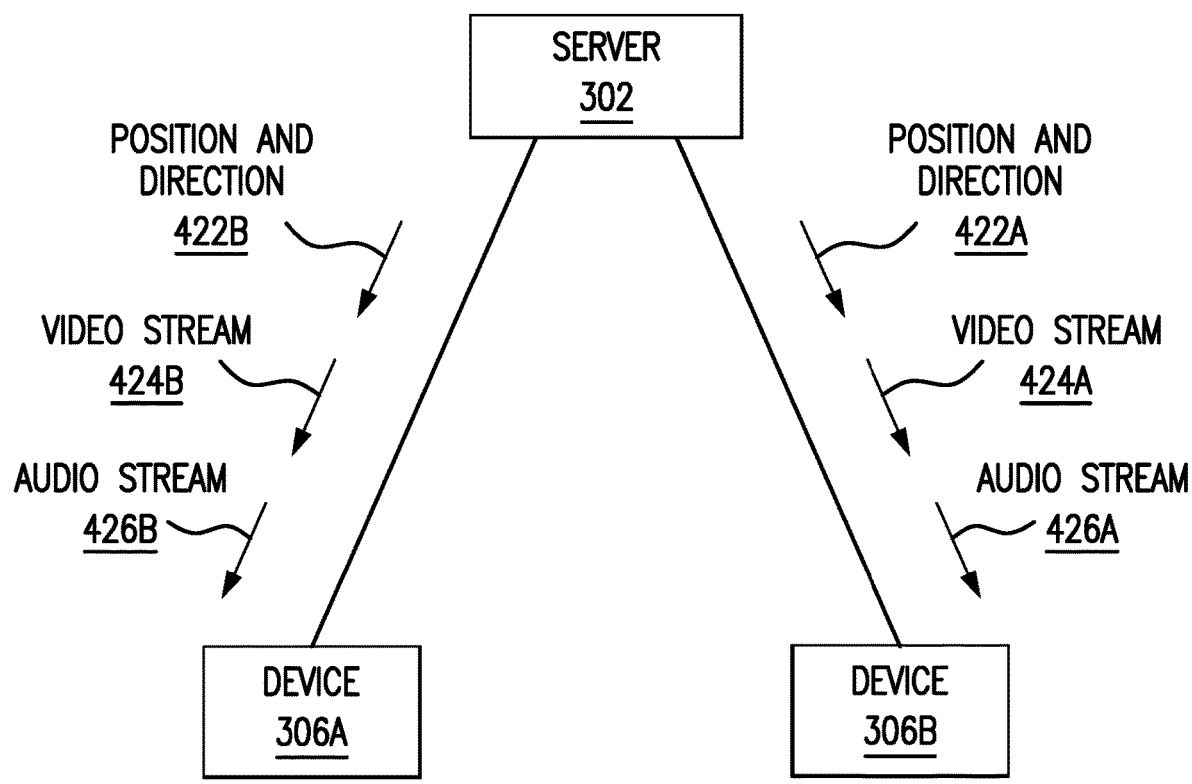

FIGS. 4A-C illustrate how data is transferred between various components of the system in FIG. 3 to provide videoconferencing. Like FIG. 3, each of FIGS. 4A-C depict the connection between server 302 and devices 306A and B. In particular, FIGS. 4A-C illustrate example data flows between those devices.

FIG. 4A illustrates a diagram 400 illustrating how server 302 transmits data describing the virtual environment to devices 306A and B. In particular, both devices 306A and B, receive from server 302 the three-dimensional arena 404, background texture 402, space hierarchy 408 and any other three-dimensional modeling information 406.

As described above, background texture 402 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

Three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Space hierarchy 408 is data specifying partitions in the virtual environment. These partitions are used to determine how sound is processed before being transferred between participants. As will be described below, this partition data may be hierarchical and may describe sound processing to allow for areas where participants to the virtual conference can have private conversations or side conversations.

Three-dimensional model 406 is any other three-dimensional modeling information needed to conduct the conference. In one aspect, this may include information describing the respective avatars. Alternatively or additionally, this information may include product demonstrations.

With the information needed to conduct the meeting sent to the participants, FIGS. 4B-C illustrate how server 302 forwards information from one device to another. FIG. 4B illustrates a diagram 420 showing how server 302 receives information from respective devices 306A and B, and FIG. 4C illustrates a diagram 460 showing how server 302 transmits the information to respective devices 306B and A. In particular, device 306A transmits position and direction 422A, video stream 424A, and audio stream 426A to server 302, which transmits position and direction 422A, video stream 424A, and audio stream 426A to device 306B. And device 306B transmits position and direction 422B, video stream 424B, and audio stream 426B to server 302, which transmits position and direction 422B, video stream 424B, and audio stream 426B to device 306A.

Position and direction 422A-B describe the position and direction of the virtual camera for the user of device 306A. As described above, the position may be a coordinate in three-dimensional space (e.g., x, y, z coordinate) and the direction may be a direction in three-dimensional space (e.g., pan, tilt, roll). In some aspects, the user may be unable to control the virtual camera's roll, so the direction may only specify pan and tilt angles. Similarly, in some aspects, the user may be unable to change the avatar's z coordinate (as the avatar is bounded by virtual gravity), so the z coordinate may be unnecessary. In this way, position and direction 422A-B each may include at least a coordinate on a horizontal plane in the three-dimensional virtual space and a pan and tilt value. Alternatively or additionally, the user may be able to "jump" it's avatar, so the Z position may be specified only by an indication of whether the user is jumping their avatar.

In different examples, position and direction 422A-B may be transmitted and received using HTTP request responses or using socket messaging.

Video stream 424A-B is video data captured from a camera of the respective devices 306A and B. The video may be compressed. For example, the video may use any commonly known video codecs, including MPEG-4, VP8, or H.264. The video may be captured and transmitted in real time.

Similarly, audio stream 426A-B is audio data captured from a microphone of the respective devices. The audio may be compressed. For example, the video may use any commonly known audio codecs, including MPEG-4 or Vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

The video stream 424A-B and audio stream 426A-B may be transmitted using the WebRTC application programming interface. The WebRTC is an API available in JavaScript. As described above, devices 306A and B download and run web applications, as conference applications 310A and B, and conference applications 310A and B may be implemented in JavaScript. Conference applications 310A and B may use WebRTC to receive and transmit video stream 424A-B and audio stream 426A-B by making API calls from its JavaScript.

As mentioned above, when a user leaves the virtual conference, this departure is communicated to all other users. For example, if device 306A exits the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A.

As described above, conference applications 310A and B may periodically or intermittently re-render the virtual space based on new information from respective video streams 424A and B, position and direction 422A and B, and new information relating to the three-dimensional environment. For simplicity, each of these updates are now described from the perspective of device 306A. However, a skilled artisan would understand that device 306B would behave similarly given similar changes.

As device 306A receives video stream 424B, device 306A texture maps frames from video stream 424A on to an avatar corresponding to device 306B. That texture mapped avatar is re-rendered within the three-dimensional virtual space and presented to a user of device 306A.

As device 306A receives a new position and direction 422B, device 306A generates the avatar corresponding to device 306B positioned at the new position and oriented at the new direction. The generated avatar is re-rendered within the three-dimensional virtual space and presented to the user of device 306A.

In some aspects, server 302 may send updated model information describing the three-dimensional virtual environment. For example, server 302 may send updated information 402, 404, 406, or 408. When that happens, device 306A will re-render the virtual environment based on the updated information. This may be useful when the environment changes over time. For example, an outdoor event may change from daylight to dusk as the event progresses.

Again, when device 306B exits the virtual conference, server 302 sends a notification to device 306A indicating that device 306B is no longer participating in the conference. In that case, device 306A would re-render the virtual environment without the avatar for device 306B.

While FIG. 3 in FIGS. 4A-4C is illustrated with two devices for simplicity, a skilled artisan would understand that the techniques described herein can be extended to any number of devices. Also, while FIG. 3 in FIGS. 4A-4C illustrates a single server 302, a skilled artisan would understand that the functionality of server 302 can be spread out among a plurality of computing devices. In an aspect, the data transferred in FIG. 4A may come from one network address for server 302, while the data transferred in FIGS. 4B-4C can be transferred to/from another network address for server 302.

In one aspect, participants can set their webcam, microphone, speakers and graphical settings before entering the virtual conference. In an alternative aspect, after starting the application, users may enter a virtual lobby where they are greeted by an avatar controlled by a real person. This person is able to view and modify the webcam, microphone, speakers and graphical settings of the user. The attendant can also instruct the user on how to use the virtual environment, for example by teaching them about looking, moving around and interacting. When they are ready, the user automatically leaves the virtual waiting room and joins the real virtual environment.

Figure 5:
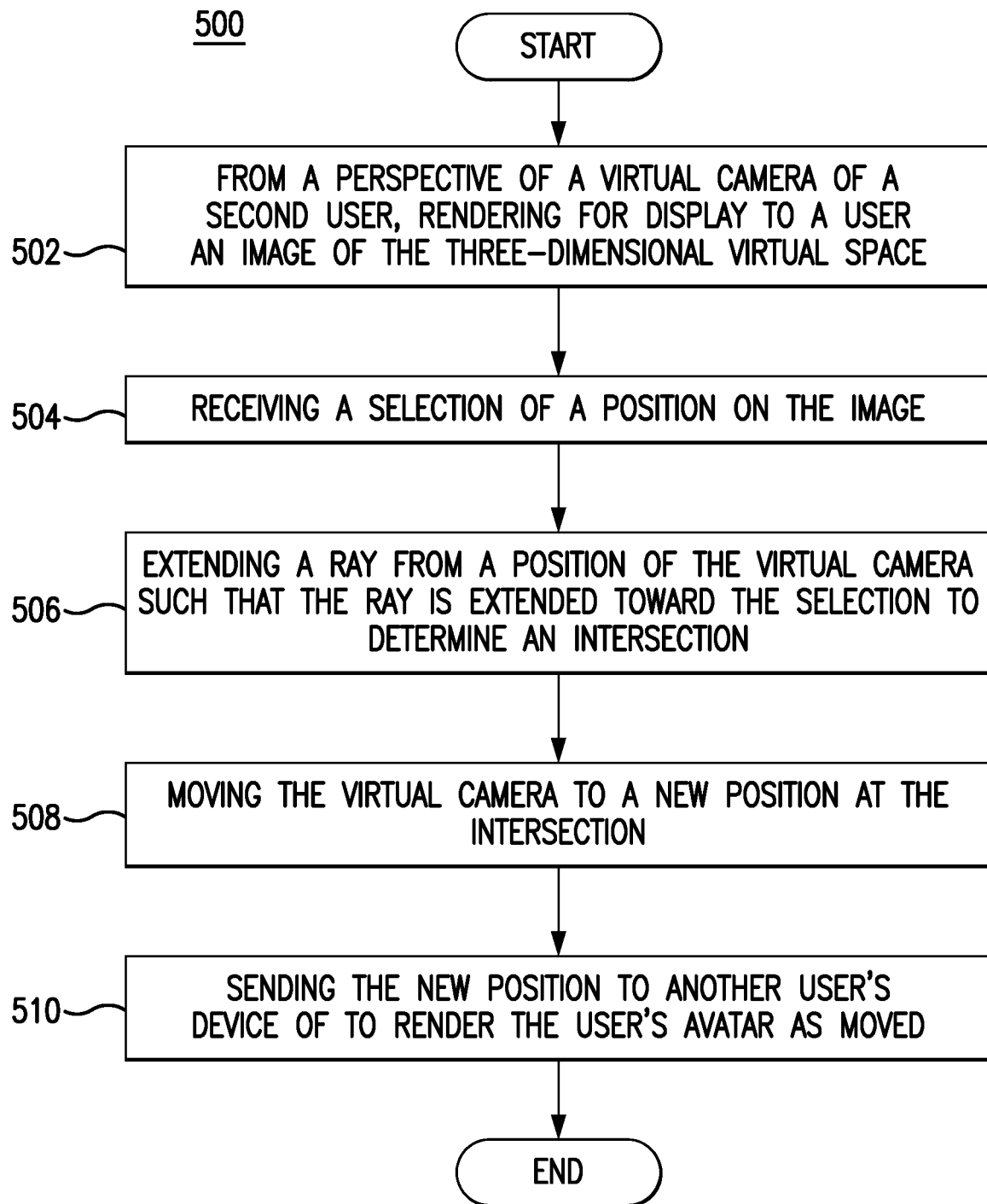
FIG. 5 is a method for navigating a virtual camera in a three-dimensional environment.
Figure 6A:
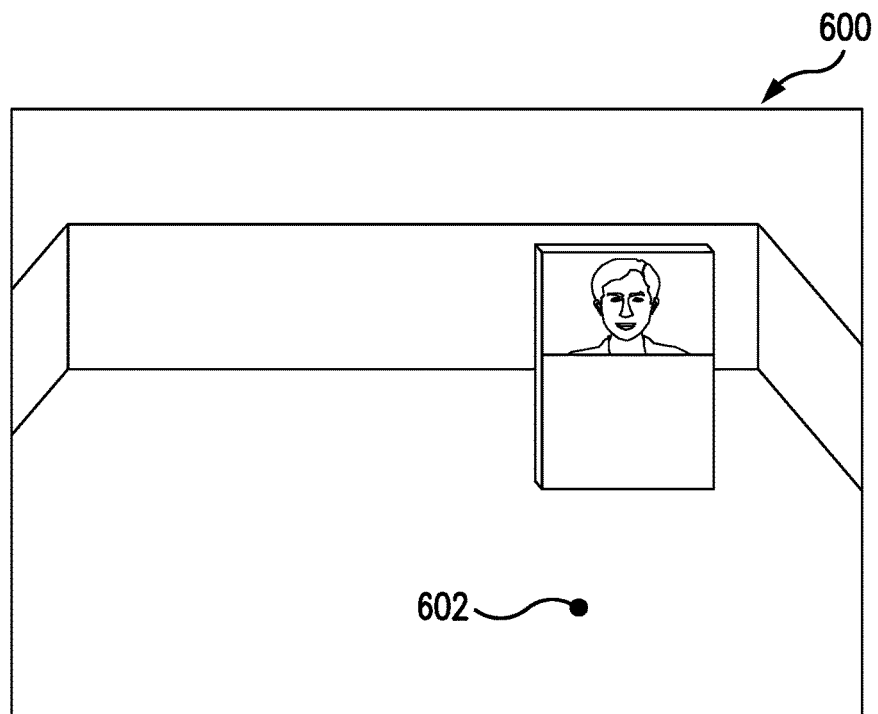
FIGS. 6A-6B are diagrams illustrating selection and navigation of an avatar in a three dimensional environment.

Navigating Virtual Cameras and Avatars to a New Position in a Virtual Environment FIG. 5 is a method 500 for navigating an avatar in a three-dimensional environment. The method may for example be executed by conference application running a browser as described above At 502, an image is rendered for display in the three-dimensional virtual space. The three-dimensional virtual space is rendered from the perspective of a virtual camera. As described above, data describing the three dimensional virtual spaces received from a server and includes a position and direction of avatars representing other users in space. That position and direction is controlled by the respective other users and transmitted from their devices. In one example, the position and direction can be controlled by the respective other users using the keyboard navigation techniques described above. In other examples, other users can control the position and direction using the method described herein. One example of such an image is illustrated in FIG. 6A as image 600.

At 504, a selection of a position on the rendered image is received. The selection is input by the user viewing the image. In an example, the selection may be a click, such as a double click, of the position of the image. In another example, the selection may be a tap or double tap of the touchscreen. Such a selection is illustrated at 602 in FIG. 6A.

Figure 6B:
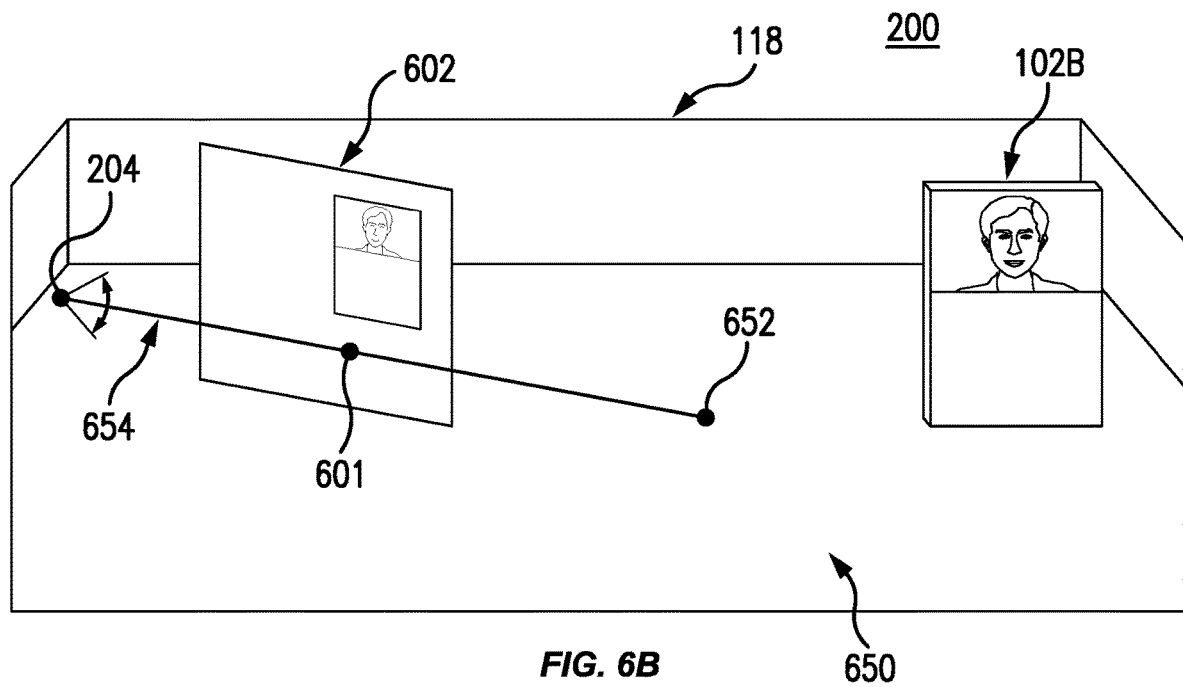

At 506, a ray is extended from a position of the virtual camera such that the ray is extended toward the selection. The ray may be extended from a focal point of the virtual camera and an angle at which the ray is extended may correspond to a focal length of the virtual camera. This is illustrated in FIG. 6B. In FIG. 6B, a ray 654 is extended from a focal point of virtual camera 204 toward selection 602 on image 600.

At 508, an intersection of the ray with an object in the three-dimensional (3D) virtual environment is determined. In FIG. 6B, the three-dimensional virtual space includes a model 650 of the ground. Ray 654 intersects with model 650 at intersection point 652.

Additionally or alternatively, a determination may be made as to what object is selected, or what type of object is selected. Depending on the object or type of object, a different action may be executed. For example, if the object is determined to represent a floor or stair of the three-dimensional environment, the movement at step 510 is conducted. However, if the object is determined to represent a desk, avatars in the virtual camera may be positioned around the desk.

To classify the objects, the objects may be labeled. For example, each three-dimensional model in the environment may have a label signifying a type. When the intersection is determined at step 508, the label of the selected object may be looked up. Additionally or alternatively, location or shape of the object may be analyzed to determine a type of the object. For example, if the object is located below a certain threshold relative to the avatar, the object may be determined to represent the floor. In another example, if the object is at a particular angle, the object may be determined to represent a stair.

At 510, the virtual camera is moved to a new position at the intersection. The new position may be in proximity or directly above or below the intersection. When the virtual camera is moved, the coordinates representing the viewing plane are altered, creating a new perspective of the three-dimensional virtual environment. From the new perspective of the virtual camera of a second user, the three-dimensional virtual space is re-rendered for display to the second user. In addition, the new position is sent to devices of other users in the virtual conference to render for display to the other users the three-dimensional virtual space including a video avatar at the new position in the three-dimensional virtual space.

Navigating to Another Participant in a Virtual Conference Space

Figure 7:
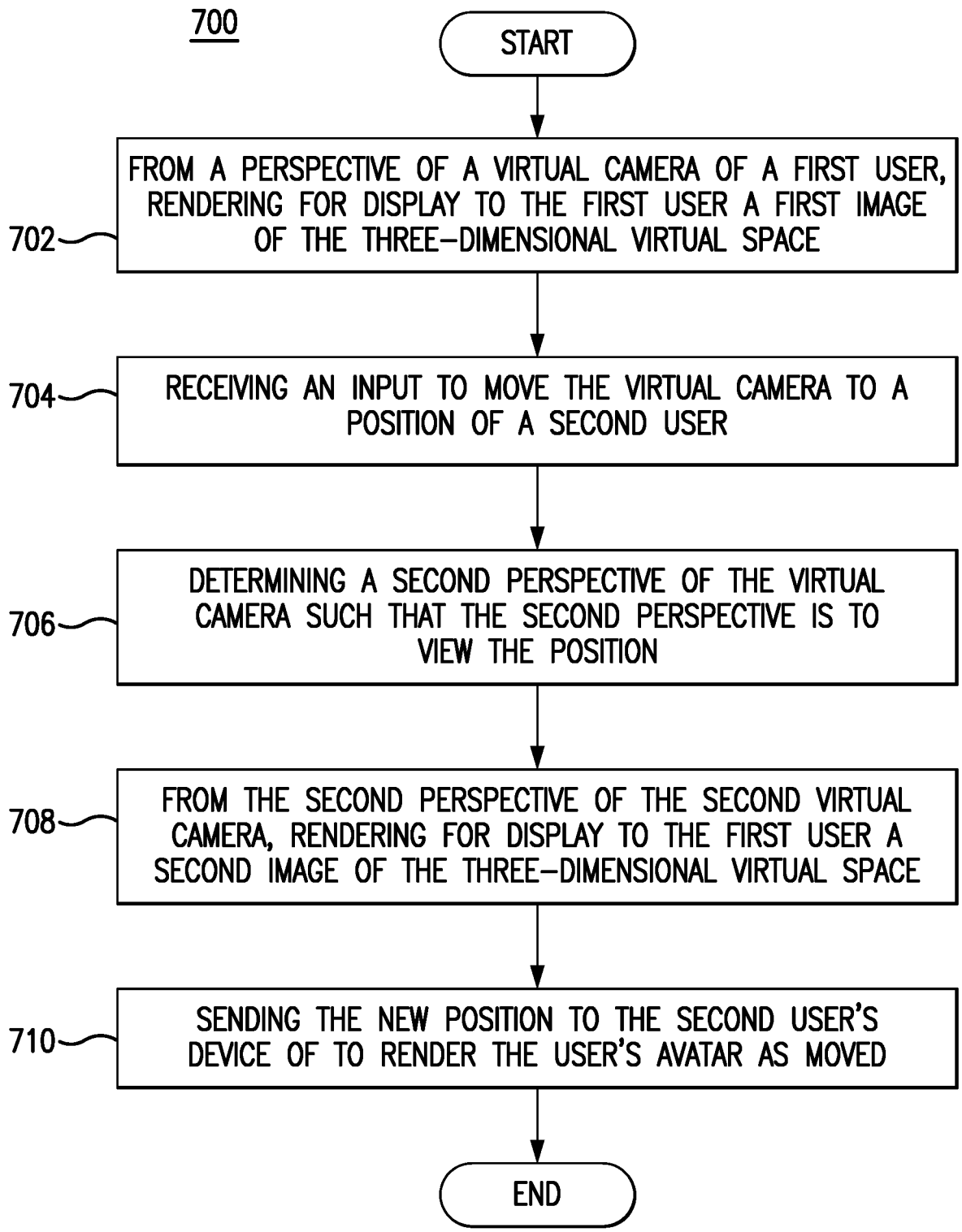
FIG. 7 is a method for navigating to another participant in a three-dimensional environment.

FIG. 7 is a method 700 for navigating to another participant in a three-dimensional environment. The method may for example be executed by conference application running a browser as described above.

Method 700 starts at step 702. At 702, from a first perspective of a virtual camera of a user, an image of a three-dimensional virtual space is rendered for display to the user. As described above, data describing the three dimensional virtual spaces received from a server and includes a position and direction of avatars representing other users in space. That position and direction is controlled by the respective other users and transmitted from their devices.

Figure 8A:
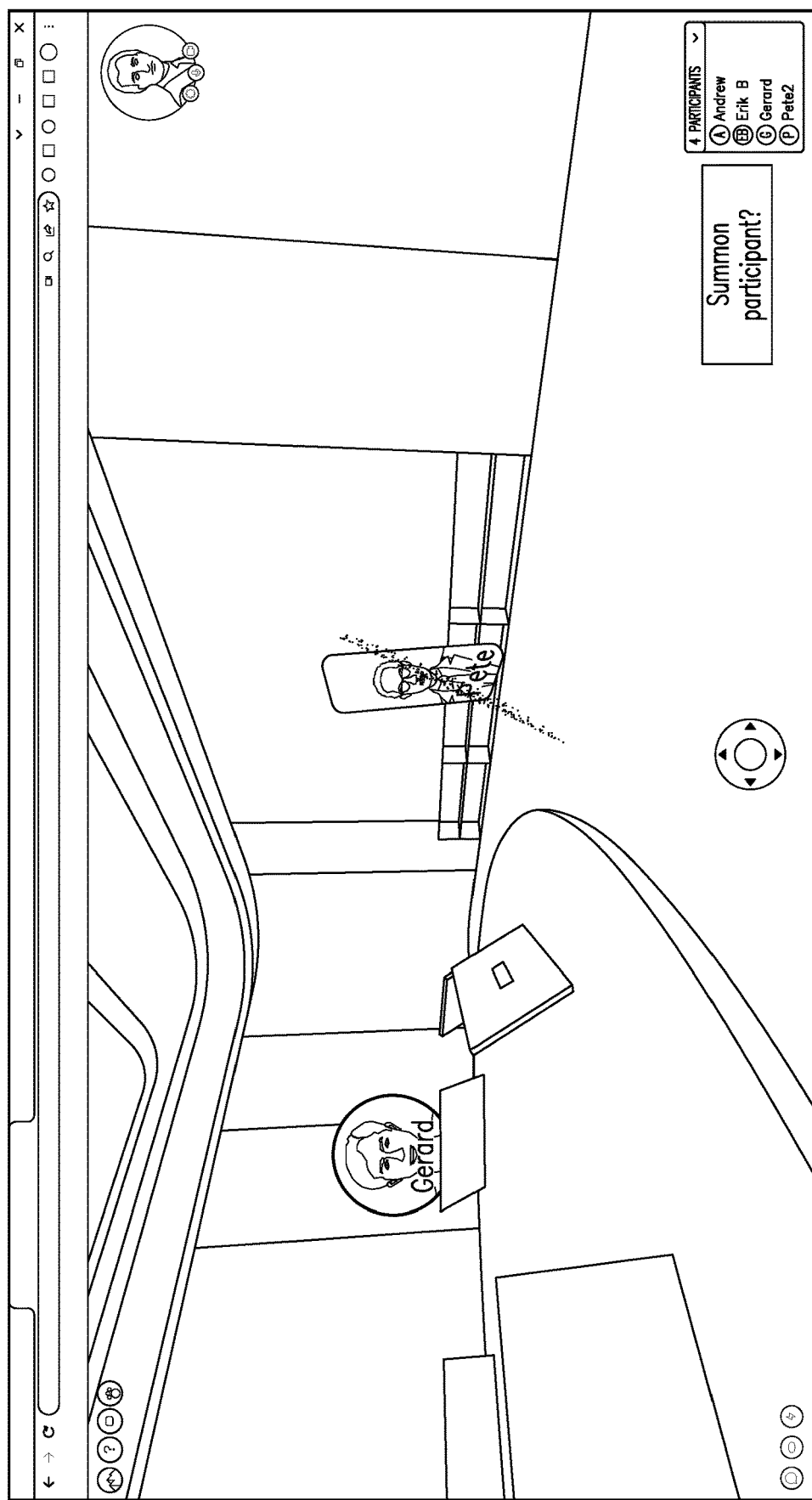
FIGS. 8A-C are diagrams illustrating various user interfaces for the method in FIG. 7.

At 704, receiving an input to move the virtual camera to a position of another user. In one embodiment, the input may be to summon the user—here the first user—to the position of the other user—here the second user. For example, the second user may select the first user from a list of participants presented to the second user by the second user's conference application. This is illustrated in FIG. 8A. In response to the selection, the second user's conference application may send a message, perhaps through an intermediate server, to the first user's conference application. The first user's conference application may provide a message to the first user and asking for the first user's consent to the move the first user's virtual camera to the second user's location. If the first user answers affirmatively providing consent, operation continues to step 706.

Figure 8B:
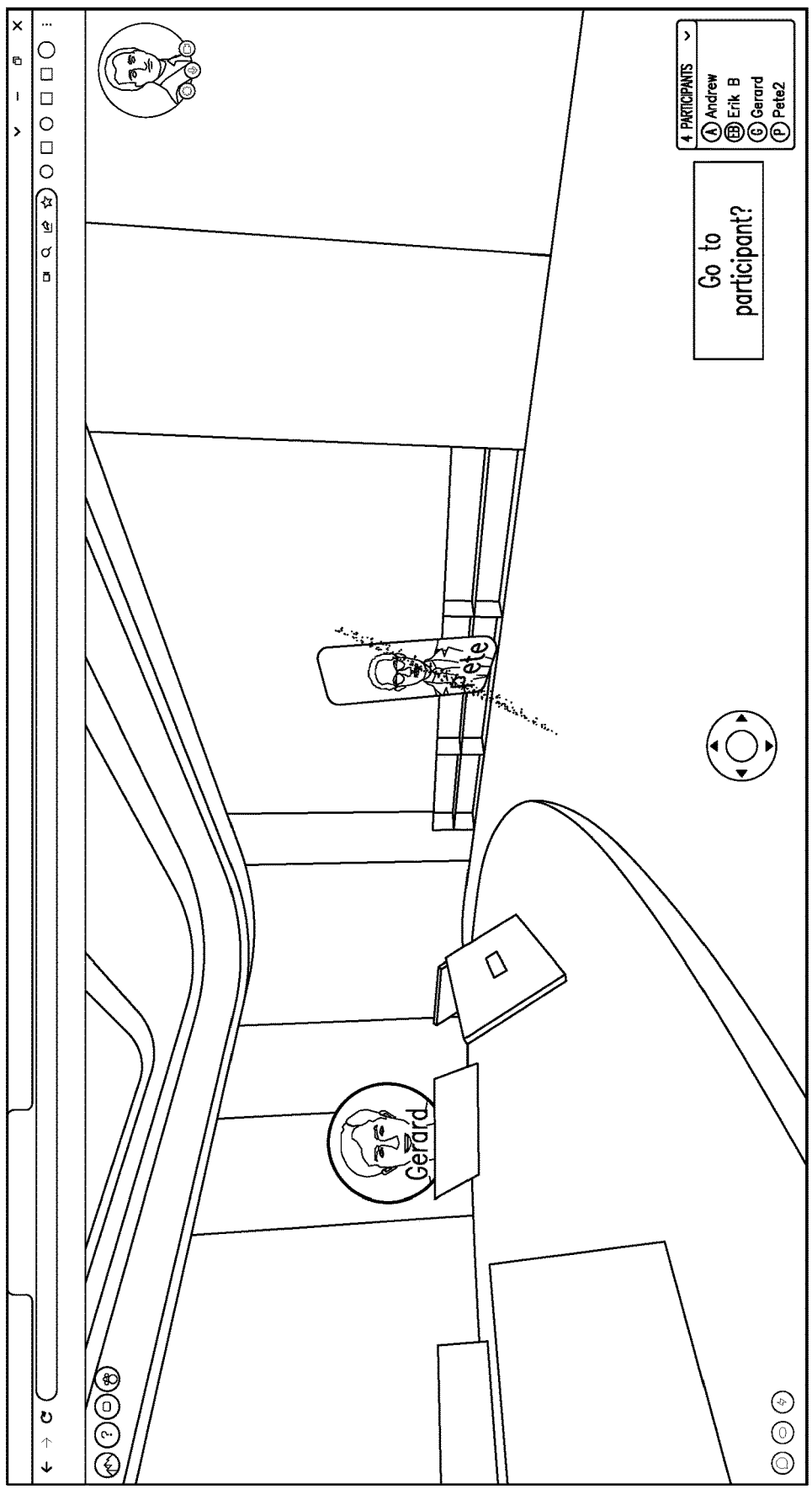

In another embodiment, the input may be to transport to another user. In this case, a first user indicating her desire to move her virtual camera to go to a location of a second user's avatar. For example, the first user may select the second user from a list of participants presented to the first user by the first user's conference application. This is illustrated in FIG. 8B. In response to the selection, the first user's conference application may send a message, perhaps through an intermediate server, to the second user's conference application. The second user's conference application may provide a message to the second user and asking for the second user's consent to the move the first user's virtual camera to the second user's location. If the second user answers affirmatively providing consent, a message is provided from the second user's conference application to the first user's, and operation continues to step 706.

At 706, a second perspective of the virtual camera is determined such that the second perspective is to view the position of the second user to move to. The perspective may be specified by a position and direction of the virtual camera. The new position may be determined such that the new position is in proximity of the position of the second user's avatar. And the new direction is may be determined to face the first position. The new position and direction may be determined such that the virtual camera faces the other user's avatar in that they virtual camera can capture a video stream captured of the other user. The new position and direction may be determined to take into account any obstructions in the three-dimensional virtual environment and may be selected such that the first user's virtual camera captures the second user's avatar without any obstructions.

In an embodiment, the three-dimensional virtual space may be segregated into different volume areas that define where sound can travel to within the three-dimensional virtual space. For example, those users within the same volume area may receive each other's audio streams, and may fail to receive audio streams from other participants to the three-dimensional virtual space are not disabling. In that embodiment, the new position and direction may be determined such that the new position is within the same volume area of the second user so that the first user can receive audio from the second user and vice versa.

At 708, a second image of the three-dimensional virtual space is rendered from the perspective determined at step 706. As described above, the second image the second image includes a video stream mapped to a model representing the first user in the three-dimensional virtual space.

At 710, the position and direction specifying the new perspective determined at step 706 is transmitted to a device of the second user. A conference application on the device of the second user uses the new position and direction to render, for presentation of the second user, the three-dimensional virtual space with a model representing the first user, the second model positioned at the new position and direction.

Device Components and Computer Systems for Videoconferencing in a Virtual Environment FIG. 7 is a diagram of a system 700 illustrating components of devices used to provide videoconferencing within a virtual environment. In various aspects, system 700 can operate according to the methods described above.

Device 306A is a user computing device. Device 306A could be a desktop or laptop computer, smartphone, tablet, or wearable device (e.g., watch or head mounted device). Device 306A includes a microphone 702, camera 704, stereo speaker 706, and input device 712. Not shown, device 306A also includes a processor and persistent, non-transitory and volatile memory. The processors can include one or more central processing units, graphic processing units or any combination thereof.

Microphone 702 converts sound into an electrical signal. Microphone 702 is positioned to capture speech of a user of device 306A. In different examples, microphone 702 could be a condenser microphone, electret microphone, moving-coil microphone, ribbon microphone, carbon microphone, piezo microphone, fiber-optic microphone, laser microphone, water microphone, or MEMs microphone.

Camera 704 captures image data by capturing light, generally through one or more lenses. Camera 704 is positioned to capture photographic images of a user of device 306A. Camera 704 includes an image sensor (not shown).

The image sensor may, for example, be a charge coupled device (CCD) sensor or a complementary metal oxide semiconductor (CMOS) sensor. The image sensor may include one or more photodetectors that detect light and convert it to electrical signals. These electrical signals captured together in a similar timeframe comprise a still photographic image. A sequence of still photographic images captured at regular intervals together comprise a video. In this way, camera 704 captures images and videos.

Stereo speaker 706 is a device which converts an electrical audio signal into a corresponding left-right sound. Stereo speaker 706 outputs the left audio stream and the right audio stream generated by an audio processor to be played to device 306A's user. Stereo speaker 706 includes both ambient speakers and headphones that are designed to play sound directly into a user's left and right ears. Example speakers includes moving-iron loudspeakers, piezoelectric speakers, magnetostatic loudspeakers, electrostatic loudspeakers, ribbon and planar magnetic loudspeakers, bending wave loudspeakers, flat panel loudspeakers, heil air motion transducers, transparent ionic conduction speakers, plasma arc speakers, thermoacoustic speakers, rotary woofers, moving-coil, electrostatic, electret, planar magnetic, and balanced armature.

Network interface 708 is a software or hardware interface between two pieces of equipment or protocol layers in a computer network. Network interface 708 receives a video stream from server 302 for respective participants for the meeting. The video stream is captured from a camera on a device of another participant to the video conference. Network interface 708 also receives data specifying a three-dimensional virtual space and any models therein from server 302. For each of the other participants, network interface 708 receives a position and direction in the three-dimensional virtual space. The position and direction are input by each of the respective other participants.

Network interface 708 also transmits data to server 302. It transmits the position of device 306A's user's virtual camera used by renderer 718 and it transmits video and audio streams from camera 704 and microphone 702.

Display 710 is an output device for presentation of electronic information in visual or tactile form (the latter used for example in tactile electronic displays for blind people). Display 710 could be a television set, computer monitor, head-mounted display, heads-up displays, output of a augmented reality or virtual reality headset, broadcast reference monitor, medical monitors mobile displays (for mobile devices), or Smartphone displays (for smartphones). To present the information, display 710 may include an electroluminescent (ELD) display, liquid crystal display (LCD), light-emitting diode (LED) backlit LCD, thin-film transistor (TFT) LCD, light-emitting diode (LED) display, organic light-emitting diode (OLED) display, active-matrix organic light-emitting diode (AMOLED) display, plasma (PDP) display, or quantum dot (QLED) display.

Input device 712 is a piece of equipment used to provide data and control signals to an information processing system such as a computer or information appliance. Input device 712 allows a user to input a new desired position of a virtual camera used by renderer 718, thereby enabling navigation in the three-dimensional environment. Examples of input devices include keyboards, mouse, scanners, joysticks, and touchscreens.

Web browser 308A and conference application 310A were described above with respect to FIG. 3. Conference application 310A includes situator 714, texture mapper 716, renderer 718, and virtual situator 720.

Situator 714 selects locations within a virtual environment, repositions and resituates avatars and virtual cameras to the selected locations within the virtual environment, and sends instructions to various user devices (e.g., 306A). Situator 714 allows a user, through display 710, to better interact with other users by arranging the other users' avatars around a virtual object rendered by renderer 718 within the virtual environment. Situator 714 also communications with other user devices so that the other users' perspectives, through their virtual cameras, are adjusted similarly.

Texture mapper 716 texture maps the video stream onto a three-dimensional model corresponding to an avatar. Texture mapper 716 may texture map respective frames from the video to the avatar. In addition, texture mapper 716 may texture map a presentation stream to a three-dimensional model of a presentation screen.

Renderer 718 renders, from a perspective of a virtual camera of the user of device 306A, for output to display 710 the three-dimensional virtual space including the texture-mapped three-dimensional models of the avatars for respective participants located at the received, corresponding position and oriented in the direction. Renderer 718 also renders any other three-dimensional models including for example the presentation screen.

Virtual situator 720 determines new locations for perceived representations of user avatars (e.g., perceived avatars) and resituates the perceived avatars to the new locations. Virtual situator 720 allows a user, through display 710, to better interact with other users by arranging the other users' perceived avatars within the user's field of view.

Server 302 includes an attendance notifier 722, a stream adjuster 724, and a stream forwarder 726.

Attendance notifier 722 notifies conference participants when participants join and leave the meeting. When a new participant joins the meeting, attendance notifier 722 sends a message to the devices of the other participants to the conference indicating that a new participant has joined. Attendance notifier 722 signals stream forwarder 726 to start forwarding video, audio, and position/direction information to the other participants.

Stream adjuster 724 receives a video stream captured from a camera on a device of a first user. Stream adjuster 724 determines an available bandwidth to transmit data for the virtual conference to the second user. It determines a distance between a first user and a second user in a virtual conference space. And, it apportions the available bandwidth between the first video stream and the second video stream based on the relative distance. In this way, stream adjuster 724 prioritizes video streams of closer users over video streams from farther ones. Additionally or alternatively, stream adjuster 724 may be located on device 306A, perhaps as part of conference application 310A.

Stream forwarder 726 broadcasts position/direction information, video, audio, and screen share screens received (with adjustments made by stream adjuster 724). Stream forwarder 726 may send information to the device 306A in response to a request from conference application 310A. Conference application 310A may send that request in response to the notification from attendance notifier 722.

Network interface 728 is a software or hardware interface between two pieces of equipment or protocol layers in a computer network. Network interface 728 transmits the model information to devices of the various participants. Network interface 728 receives video, audio, and screen share screens from the various participants.

Situator 714, texture mapper 716, renderer 718, virtual situator 720, attendance notifier 722, stream adjuster 724, and stream forwarder 726 can each be implemented in hardware, software, firmware, or any combination thereof.

System 700 can also include a screen capturer, configured to capture a presentation stream, and an audio processor, configured to adjust volume of the received audio stream.

Figure 8C:
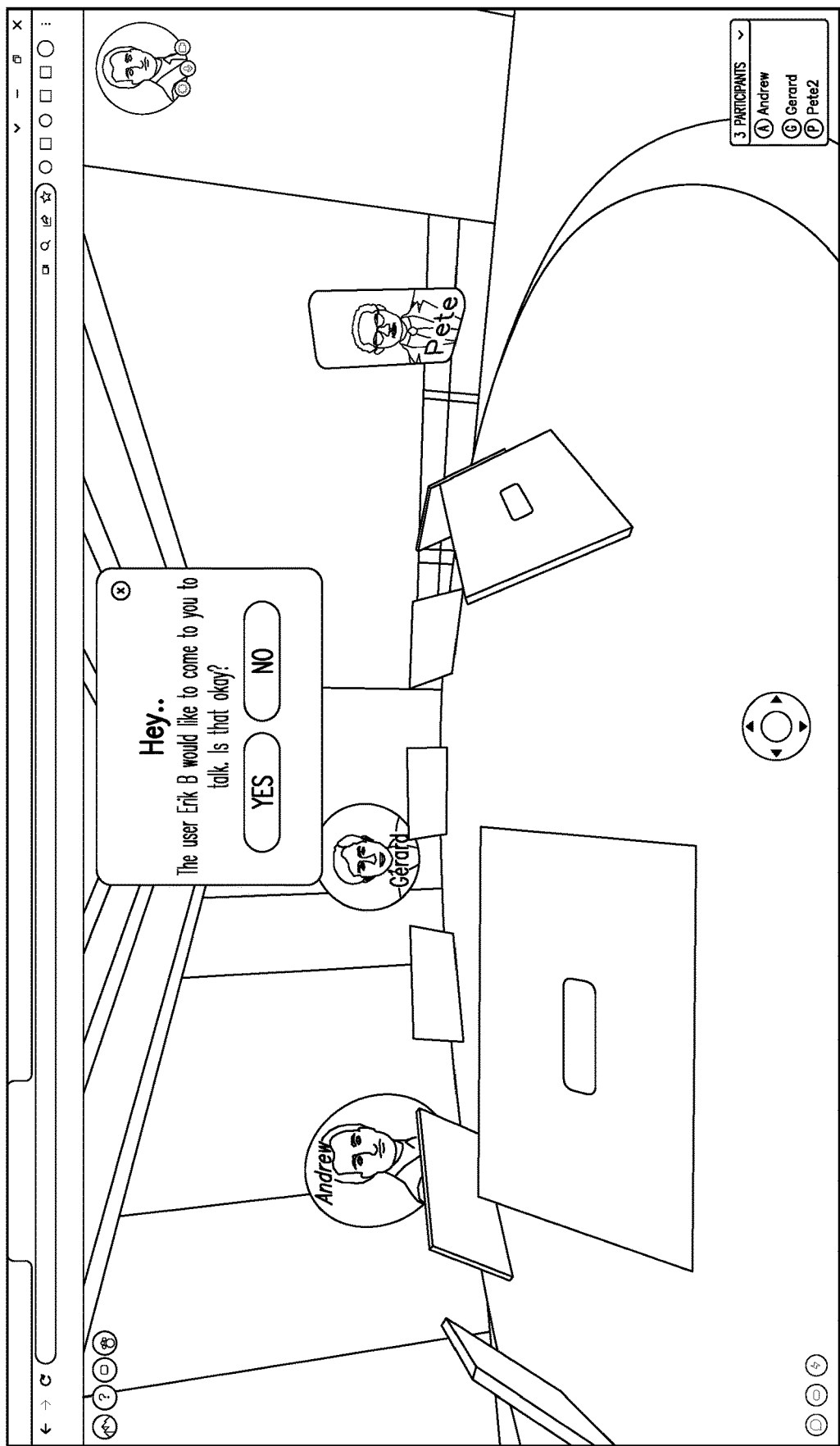
Figure 9:
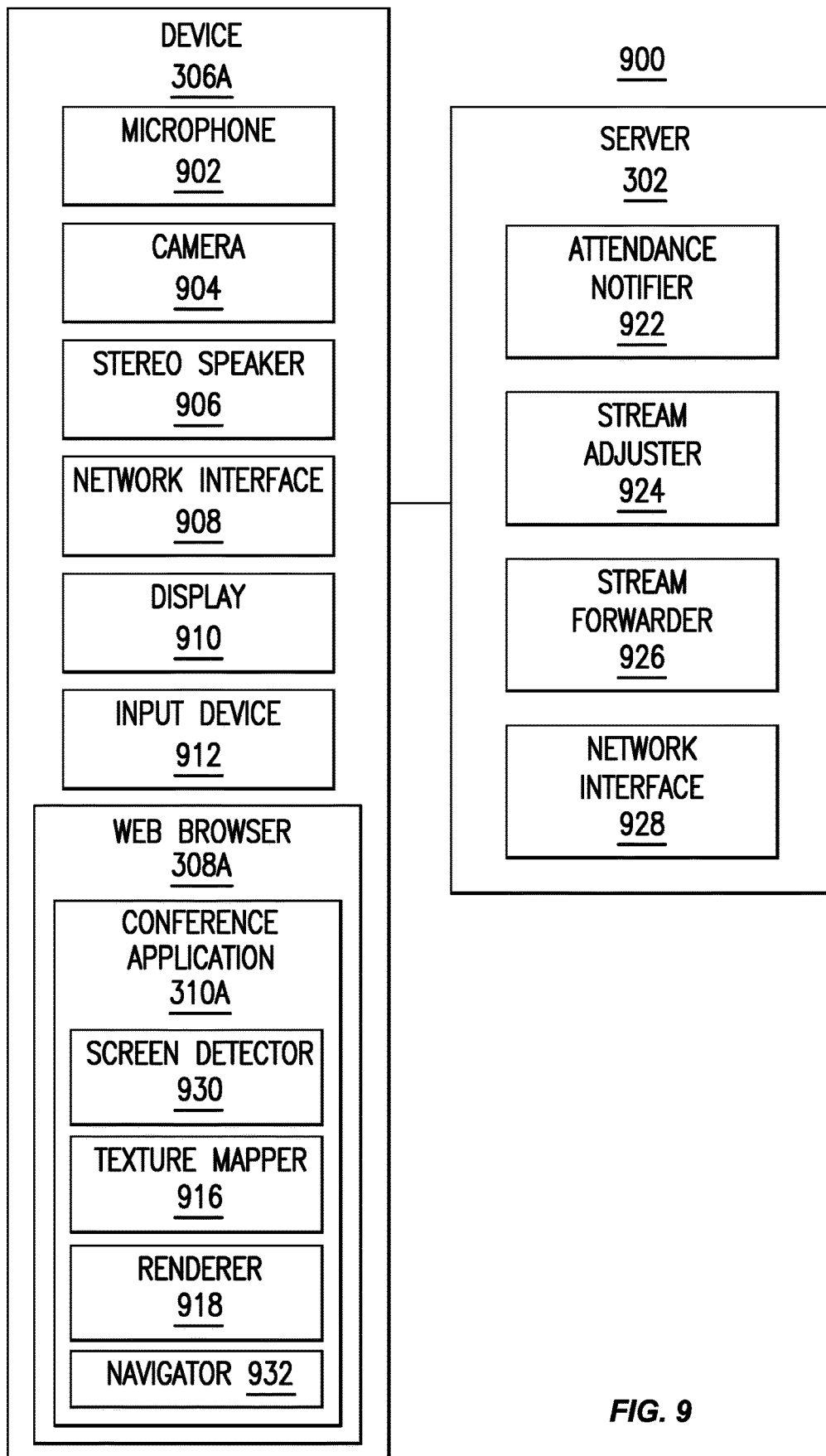
FIG. 9 is a diagram illustrating components of devices used to provide videoconferencing within a virtual environment.
Figure 10:
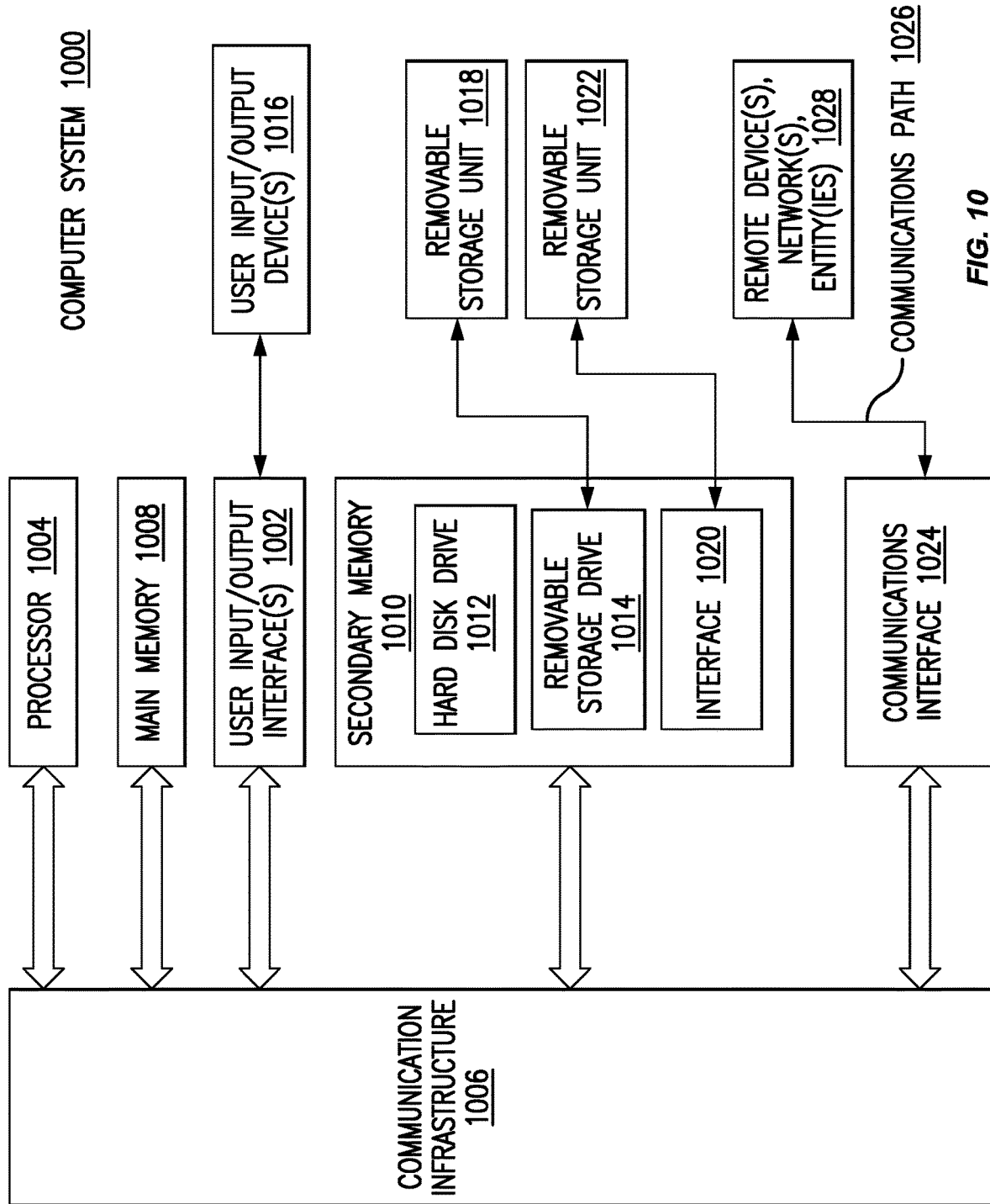
FIG. 10 is a block diagram of an example computer system useful for implementing various aspects.

Various aspects can be implemented, for example, using one or more computer systems, such as computer system 800 shown in FIG. 8. Computer system 800 can be used, for example, to implement a system for resituating virtual cameras and avatars in a virtual environment. For example, computer system 800 can render a three-dimensional virtual environment, position and resituate virtual cameras, and generate and resituate perceived avatars corresponding to user avatars. Computer system 800 can be any computer capable of performing the functions described herein.

Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 816, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, a tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 reads from and/or writes to removable storage unit 818 in a well-known manner.

According to an exemplary aspect, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it would be apparent to persons skilled in the relevant art(s) how to make and use aspects of this disclosure using data processing devices, computer systems and/or computer architectures other than that shown in FIG. 8. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary aspects, but should be defined only in accordance with the following claims and their equivalents.

What is claimed is:

1. A computer implemented method for navigating in a three-dimensional (3D) virtual environment, comprising:
   (a) receiving a selection of a position on an image of a three-dimensional virtual space, the image depicted to a user from a perspective of a virtual camera corresponding to an avatar in the three-dimensional virtual space, wherein the avatar is generated based on a video of the user;
   (b) extending a ray from a position of the virtual camera such that the ray is extended toward the selection;
   (c) determining an intersection of the ray with an object in the three-dimensional virtual space;
   (d) determining what object is intersected by the ray;
   (e) based on what object is intersected, determining whether to relocate the virtual camera; and
   (f) when it is determined in (e) to relocate the virtual camera, relocating the virtual camera to a new position corresponding to the position selected, such that the user views and moves around the three-dimensional virtual space from the new position using the virtual camera and the avatar.

2. The method of claim 1, wherein the selection is a click of the position on the image.

3. The method of claim 1, wherein the selection is a double click of the position on the image.

4. The method of claim 1, wherein the ray is extended based on a focal length of the virtual camera.

5. The method of claim 1, wherein steps (a)-(f) are executed with a conference application running in a web browser.

6. The method of claim 1, further comprising, after (f):
   from a new perspective of the virtual camera, rendering for display to the user the three-dimensional virtual space.

7. The method of claim 1, wherein the selection is on a touch screen device of the user.

8. A non-transitory computer-readable medium having instructions stored thereon that, when executed by at least one computing device, cause the at least one computing device to perform operations comprising:
   (a) receiving a selection of a position on an image of a three-dimensional virtual space, the image depicted to a user from a perspective of a virtual camera corresponding to an avatar in the three-dimensional virtual space, wherein the avatar is generated based on a video of the user;

(b) extending a ray from a position of the virtual camera such that the ray is extended toward the selection;

(c) determining an intersection of the ray with an object in the three-dimensional virtual space;

(d) determining what object is intersected by the ray;

(e) based on what object is intersected, determining whether to relocate the virtual camera; and (f) when it is determined in (e) to relocate the virtual camera, relocating the virtual camera to a new position corresponding to the position selected, such that the user views and moves around the three-dimensional virtual space from the new position using the virtual camera and the avatar.

9. The non-transitory computer-readable medium of claim 8, wherein the selection is a click of the position on the image.

10. The non-transitory computer-readable medium of claim 8, wherein the selection is a double click of the position on the image.

11. The non-transitory computer-readable medium of claim 8, wherein the ray is extended based on a focal length of the virtual camera.

12. The non-transitory computer-readable medium of claim 8, wherein steps (a)-(f) are executed with a conference application running in a web browser.

13. The non-transitory computer-readable medium of claim 8, wherein the operations further comprising, after (f):

from a new perspective of the virtual camera, rendering for display to the user the three-dimensional virtual space.

14. The non-transitory computer-readable medium of claim 8, wherein the selection is on a touch screen device of the user.

15. A system for navigating in a three-dimensional (3D) virtual environment, comprising:

a processor;

at least one memory coupled to the processor;

a server, executed on the processor, that in response to a request from a client device, provides a conference application to the client device, the conference application having instructions to:

(a) receive a selection of a position on an image of a three-dimensional virtual space, the image depicted to a user from a perspective of a virtual camera corresponding to an avatar in the three-dimensional virtual space, wherein the avatar is generated based on a video of the user;

(b) extend a ray from a position of the virtual camera such that the ray is extended toward the selection;

(c) determine an intersection of the ray with an object in the three-dimensional virtual space;

(d) determine what object is intersected by the ray;

(e) based on what object is intersected, determine whether to relocate the virtual camera; and (f) when it is determined in (e) to relocate the virtual camera, relocate the virtual camera to a new position corresponding to the position selected, such that the user views and moves around the three-dimensional virtual space from the new position using the virtual camera and the avatar.

16. The system of claim 15, wherein the selection is a click of the position on the image.

17. The system of claim 15, wherein the selection is a double click of the position on the image.

18. The system of claim 15, wherein the conference application is configured to execute in a web browser of the client device.

19. The system of claim 15, the operations further comprising, after (f):

from a new perspective of the virtual camera, rendering for display to the user the three-dimensional virtual space.

20. The system of claim 15, wherein the selection is on a touch screen device of the user.

* * * * *